(12) United States Patent
Nagata et al.

(10) Patent No.: US 6,467,937 B2
(45) Date of Patent: Oct. 22, 2002

(54) ROOM LAMP FIXING STRUCTURE

(75) Inventors: Satoshi Nagata, Isehara (JP); Eiji Hibi, Toyota (JP); Yoshinori Noritake, Toyota (JP)

(73) Assignees: Ichikoh Industries, Ltd., Tokyo (JP); Toyota Jidosha Kabushiki Kaisha, Toyota (JP)

( * ) Notice: Subject to any disclaimer, the term of this patent is extended or adjusted under 35 U.S.C. 154(b) by 28 days.

(21) Appl. No.: 09/809,096

(22) Filed: Mar. 16, 2001

(65) Prior Publication Data

US 2001/0022730 A1 Sep. 20, 2001

(30) Foreign Application Priority Data

Mar. 16, 2000 (JP) ........................................ 2000-079321

(51) Int. Cl.⁷ ............................ F21V 19/00; F21V 21/04
(52) U.S. Cl. ...................... 362/490; 362/488; 362/493; 362/548; 362/549
(58) Field of Search .................................. 362/479, 490, 362/488, 489, 482, 493, 548, 549, 306; 248/27.3, 222.11, 222.12, 223.21

(56) References Cited

U.S. PATENT DOCUMENTS 6,092,916 A * 7/2000 Davis, Jr. et al. ........... 362/490

FOREIGN PATENT DOCUMENTS

| JP | 11-115628 | 4/1999 |
| JP | 11-348657 | 12/1999 |

* cited by examiner

*Primary Examiner*—Alan Cariaso
*Assistant Examiner*—Sharon Payne
(74) *Attorney, Agent, or Firm*—Foley & Lardner

(57) ABSTRACT

A room lamp fixing structure having a temporary fixing means provided for a room lamp and a ceiling trim and a permanent fixing means provided for the room lamp and a ceiling framework of a car body. This construction includes a ceiling trim having a recess for accommodating the room lamp, the recess having its side surface inclined so as to become gradually narrow from the opening portion to the bottom portion, and a room lamp having in its side surface a guide projection for positioning the room lamp and the ceiling trim by abutting against the slant side surface of the recess during the permanent fixing. This structure allows the guide projection to abut against the slant side surface, and thereby the room lamp and the ceiling trim are positioned.

10 Claims, 12 Drawing Sheets

ROOM LAMP FIXING STRUCTURE

BACKGROUND OF THE INVENTION

1. Field of the Invention

The present invention relates to a room lamp fixing structure for attaching a room lamp of a motor vehicle to a ceiling with sufficiently high positioning accuracy. More particularly, the present invention relates to a room lamp fixing structure in which a room lamp and a ceiling trim are modularized, and the resultant module is temporarily fixed to the ceiling framework of a car body first and is thereafter permanently fixed thereto, the room lamp fixing structure allowing highly accurate permanent fixing of the room lamp module.

2. Description of the Prior Art

Prior art room lamp fixing structures are disclosed in, for example, Japanese Patent Laid-Open Publication Nos. Hei 11-115628 and Hei 11-348657.

In these conventional room lamp fixing structures, a room lamp and a ceiling trim are modularized, and the resultant module is temporarily fixed to the ceiling framework of a car body first and is thereafter permanently fixed thereto. In this construction, a common hook is shared between the temporary fixing and the permanent fixing. That is, the prior art construction is composed of a room lamp with a harpoon-shaped hook and a support bracket for covering the room lamp, which has upper and lower stepped portions and is caught by the hook inserted thereinto. In this prior art construction, the hook is inserted into the support bracket so as to be caught in the lower stepped portion of the bracket, and thereby the support bracket and the room lamp are temporarily fixed to each other. Then, in the automobile assembly line, the module, obtained by modularizing the support bracket and the room lamp, is attached to the ceiling framework of the motor vehicle. At this time, by further inserting the room lamp into the support bracket, the hook is caught in the upper stepped portion thereof, and thereby the room lamp and the support bracket are permanently fixed to each other, and they are fixed to the ceiling framework.

This prior art construction, however, when the module composed of the room lamp and the support bracket is attached to the ceiling framework of the motor vehicle, pays no regard to positioning accuracy of the module relative to the ceiling. Particularly, in the prior art construction, since a common hook is used to fix the module temporarily and permanently, if positional deviation occurs during the temporary fixing, the hook is not capable of compensating for the positional deviation during the permanent fixing. This makes satisfactory permanent fixing impossible.

Furthermore, in general, an error occurs when the ceiling is attached to the car body. Therefore, when the module is fixed to the ceiling, this error needs to be compensated for. In the conventional fixing structure, however, when the module is permanently fixed to the ceiling, the attaching operation is out of sight from underneath (blind operation). This makes it difficult to achieve the permanent fixing so that the error is compensated for.

SUMMARY OF THE INVENTION

An object of the present invention is to provide a room lamp fixing structure in which, during the permanent fixing, the room lamp and the ceiling trim kept in the temporary fixing state are positioned with ease and sufficiently high accuracy, and the positioning mechanism is structurally simple and inexpensive.

Another object of the present invention is to provide a room lamp fixing structure in which, even if an error occurs when the ceiling is attached to the car body and the attachment is performed as a blind operation, the relative error is successfully compensated for and thus the module composed of the room lamp and the ceiling trim is attached to the ceiling properly.

To achieve the above objects, according to the present invention, a room lamp fixing structure is composed of temporary fixing means provided for a room lamp and a ceiling trim and permanent fixing means provided for the room lamp and a ceiling framework of a car body. The room lamp fixing structure includes a ceiling trim, a room lamp, a temporary fixing means, and a permanent fixing means. The ceiling trim has a recess for housing the room lamp whose side surface is so inclined as to become gradually narrow from the opening portion to the bottom portion. The room lamp has, in its side surface, a guide projection for positioning the room lamp and the ceiling trim during the permanent fixing by abutting against the slant side surface of the recess. The temporary fixing means allows the room lamp and the ceiling trim to be temporarily fixed to each other. The permanent fixing means allows, by permanently fixing the room lamp to the ceiling framework, the room lamp and the ceiling trim kept in the temporary fixing state to be fixed to the ceiling framework.

In this room lamp fixing structure, the temporary fixing means is composed of an engagement pawl provided in the room lamp and an edge of an engagement clearance hole provided in the ceiling trim. At the edge of the engagement clearance hole of the ceiling trim a slit is formed. The engagement pawl is, after passing through the slit and the engagement clearance hole, detachably caught in the edge of the engagement clearance hole, thereby achieving the temporary fixing.

Further, in the room lamp fixing structure, between the room lamp and the bottom portion of the recess facing with each other a gap is formed to cope with changes in the board thickness of the ceiling trim.

Still further, in the fixing structure, the permanent fixing means is composed of a spring retainer and an abutting portion provided in the room lamp and a stationary portion provided in the ceiling framework. The spring retainer is elastically caught in the stationary portion, thereby achieving the permanent fixing.

With the above-described construction, in the room lamp fixing structure according to the present invention, the room lamp is housed in the recess to be temporarily fixed to the ceiling trim by the temporary fixing means, and subsequently the room lamp in its temporary fixing state is permanently fixed to the ceiling framework by the permanent fixing means. Then, the guide projection of the room lamp abuts against the slant side surface of the recess. By the resultant guiding effect exerted by the guide projection and the slant side surface, the room lamp and the ceiling trim kept in the temporary fixing state are positioned. At the same time, the room lamp and the ceiling trim kept in the temporary fixing state are fixed to the ceiling framework.

As described above, the fixing structure according to the present invention has separately-provided temporary and permanent fixing means and is so designed that both fixing means can compensate for positional deviation during the permanent fixing. This makes it possible to compensate for the positional deviation occurring with the temporary fixing during the permanent fixing. Therefore, according to the present invention, there is provided a room lamp fixing structure in which the room lamp and the ceiling trim kept in the temporary fixing state are positioned with ease and sufficiently high accuracy, and the positioning mechanism is structurally simple and inexpensive.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 14(B) showing the construction taken in the direction of arrow XIV(B) of FIG. 11; and FIG. 14(C) showing the construction taken in the direction of arrow XIV(C) of FIG. 11.

DETAILED DESCRIPTION OF THE PREFERRED EMBODIMENTS

Hereinafter, an embodiment of the room lamp fixing structure of the present invention will be described with reference to the accompanying drawings.

Figure 2:
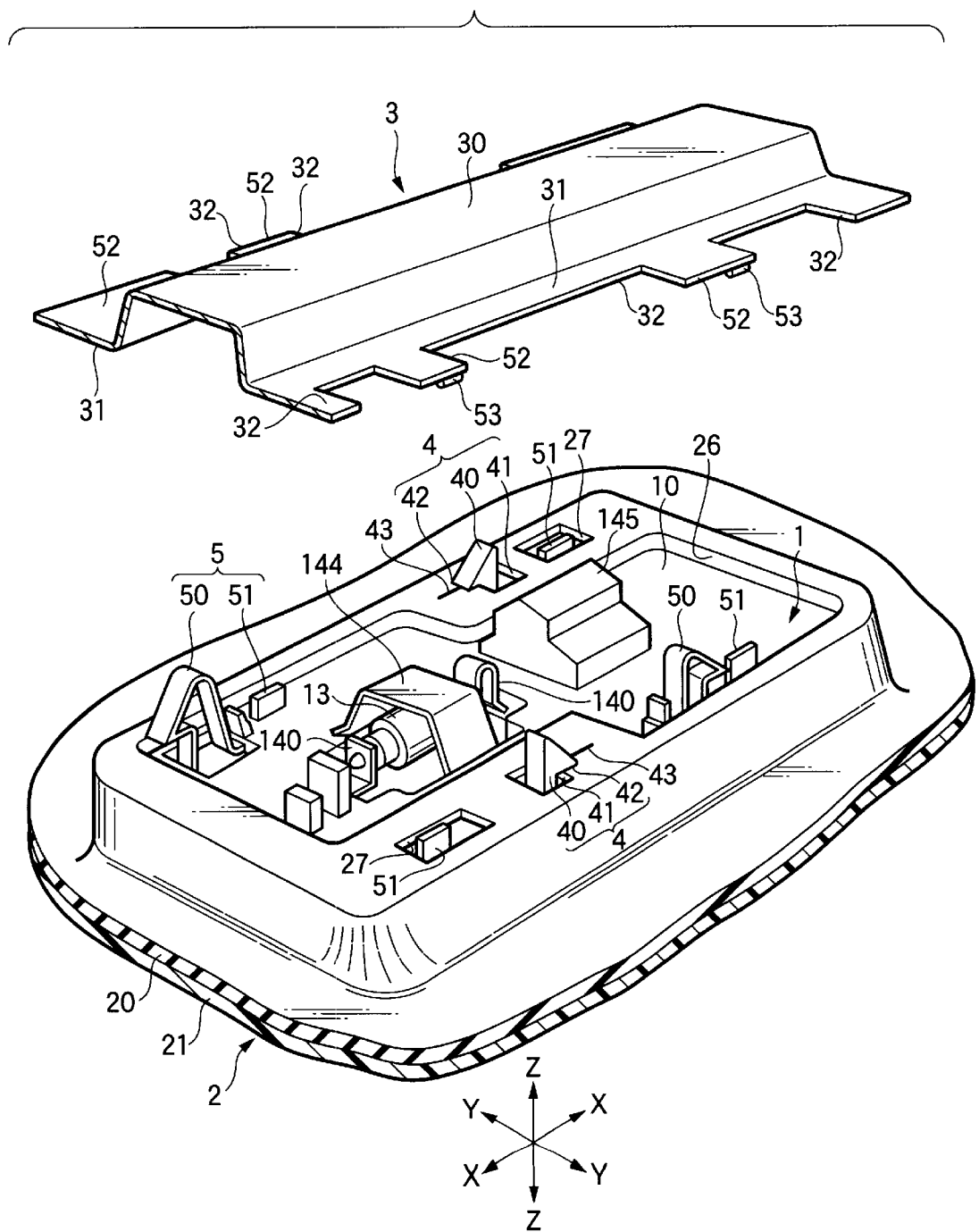
FIG. 2 is an exploded perspective view illustrating the room lamp and the ceiling trim kept in the temporary fixing state, and the ceiling framework of the embodiment.

In the room lamp attaching structure of the embodiment, a room lamp and a ceiling trim are temporarily fixed to each other, and are modularized. Then, the resulted module is permanently fixed to a ceiling framework of a motor vehicle. As shown in FIG. 2, the module is composed of a room lamp 1 including a light source bulb 13 and a ceiling trim 2 for covering the side surface and part of the top surface of the room lamp 1.

As shown in FIGS. 1 to 4, the room lamp 1 is of substantially a rectangular shape, and is provided with a lamp housing 10 to which the light source bulb 13 is attached, a lens 11 arranged below the housing 10 for transmitting light, and a switching operation knob 12 for controlling the lighting of the light source bulb 13.

<Description of Lamp Housing 10>

Figure 4:
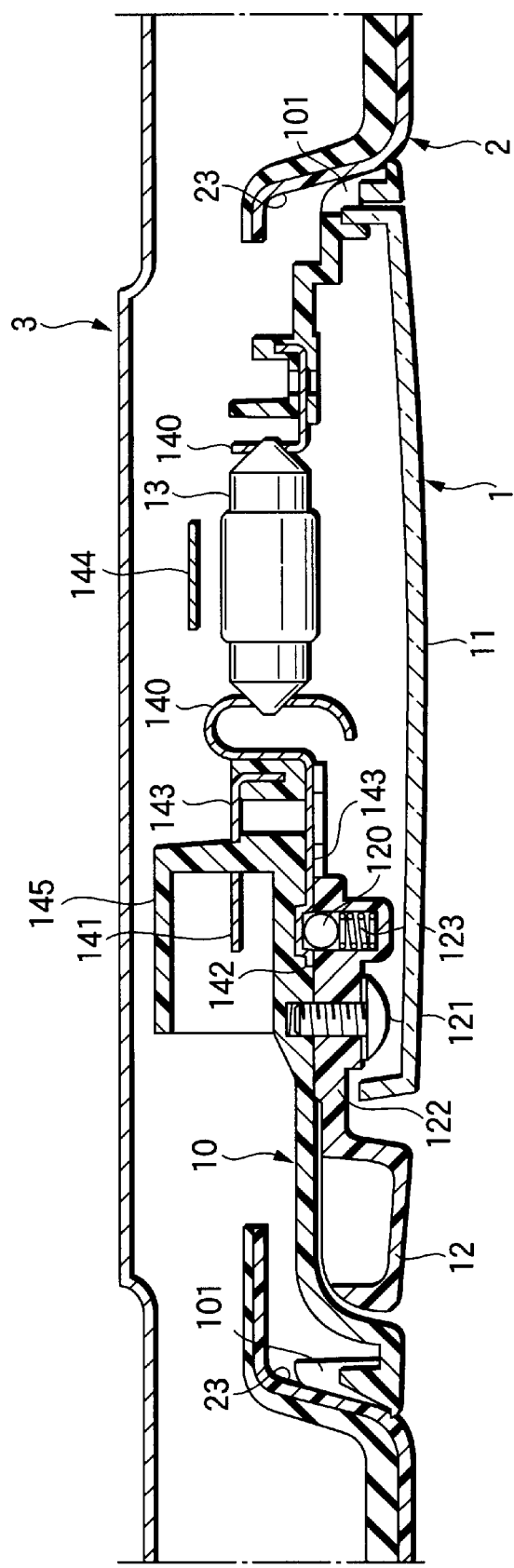
FIG. 4 is a sectional view illustrating the construction shown in FIG. 1 taken along a line IV—IV.
Figure 5:
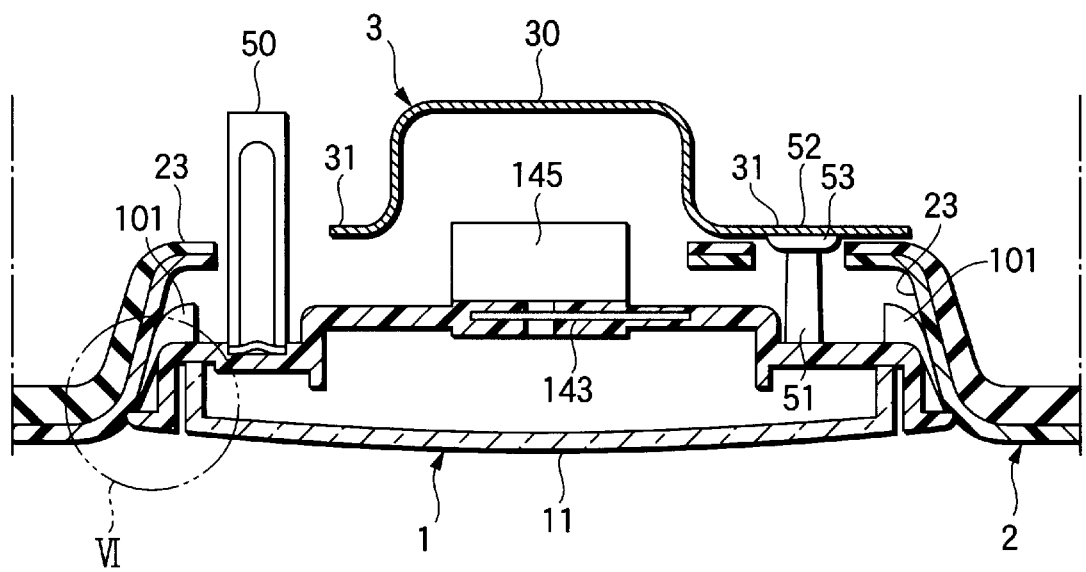
FIG. 5 is a sectional view illustrating the construction shown in FIG. 1 taken along a line V—V.

As shown particularly in FIG. 4, the lamp housing 10 is composed of two holder portions 140, three terminal portions 141, three stationary contact portions 142, a wiring portion 143, and a plate portion 144. The holder portions 140 detachably retain the light source bulb 13. The terminal portions 141 are electrically and detachably connected to a terminal (not shown) of a light-source-side connector. The stationary contact portions 142 are independently and electrically connected to a moving contact ball 120 by switching the contact ball 120 of the switching operation knob 12 so as to form respective predetermined electric circuits. The wiring portion 143 (partly shown in the figure) connects the holder portion 140, the terminal portion 141, and the stationary contact portion 142 to one another by wiring. The plate portion 144 is used for light shading and reflection. These components are formed integrally with one another by insert molding.

Note that, the terminal is selectively and electrically connected to a power source of the motor vehicle, such as a battery, a power source operating via a door switch which is turned on and off in synchronism with opening and closing actions of the door, and a ground. The two holder portions 140, the three terminal portions 141, the three stationary contact portions 142, the wiring portion 143, and the plate portion 144, which are of by nature a plurality of metal plates having elasticity and conductivity, are formed by stamping or other technique after undergoing the insert molding.

Figure 1:
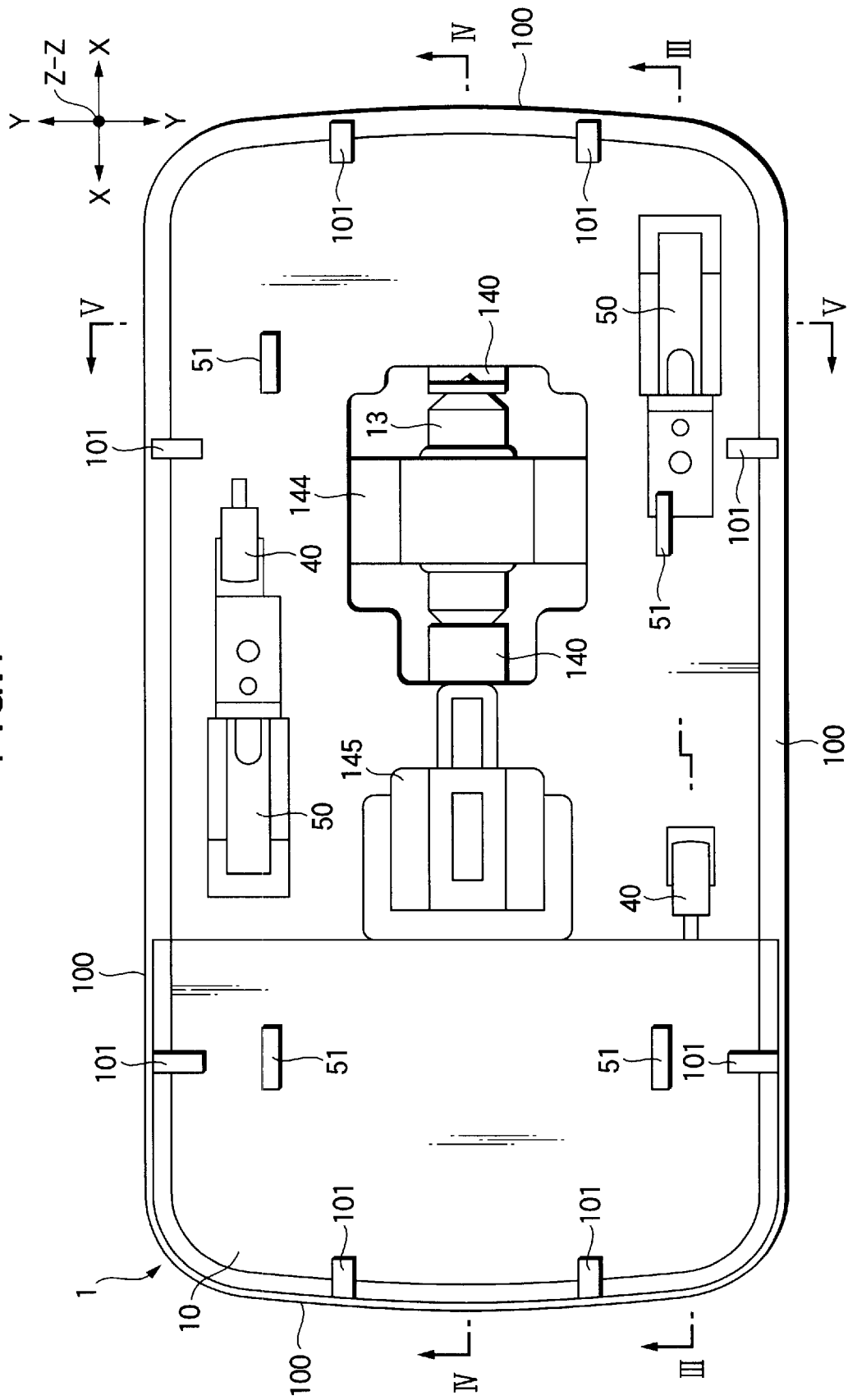
FIG. 1 is a plan view illustrating a room lamp to which an embodiment of the room lamp fixing structure of the present invention is applied.

The lamp housing 10 is formed, for example, from insulating synthetic resin. Furthermore, it has, as shown in FIG. 1, in each of its four side surfaces, namely, two shorter sides and two longer sides, two rib-shaped guide projections 101 arranged with a certain interval secured there between. The guide projection 101 serves for positioning of the room lamp 1 and the ceiling trim 2 by abutting against a slant side surface 23 of a recess 22 of the ceiling trim 2 (described later) during the permanent fixing. To effect the positioning, the guide projections 101 of the two shorter side surfaces are so formed as to protrude in the direction of the longer side of the room lamp 1 (the X direction in the figure), and the guide projections 101 of the two longer side surfaces are so formed as to protrude in the direction of the shorter side of the room lamp 1 (the Y direction in the figure).

Moreover, the guide projection 101 has a surface inclined along the slant side surface 23 of the recess 22 and is arranged in each of the four side surfaces of the room lamp 1, and the guide projection 101 is so formed as to protrude partly from its corresponding side surface to be formed into a rib-like shape. In this embodiment, although each side surface has two guide projections 101, only one, or three or more guide projections 101 may be provided therein. Alternatively, the guide projection 101 may be so formed as to extend over the entire length of the four side surfaces of the room lamp 1.

Figure 6:
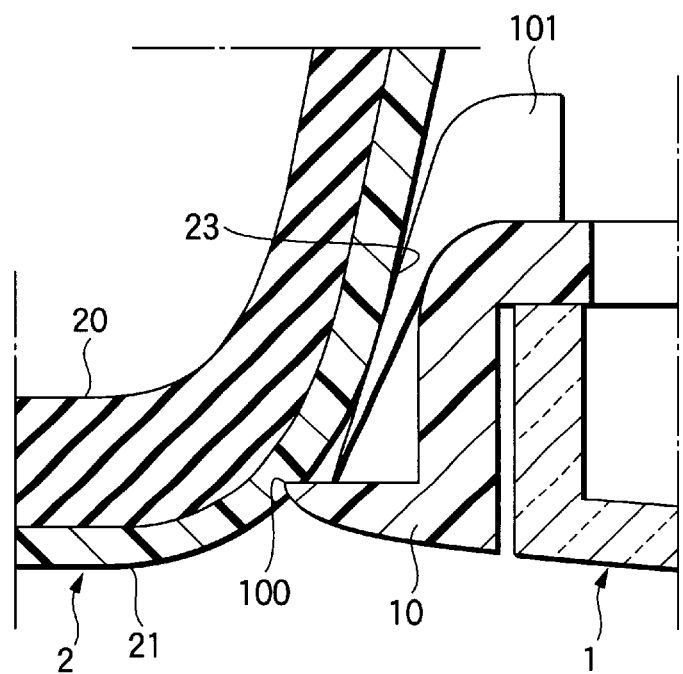
FIG. 6 is an enlarged sectional view illustrating the VI portion shown in FIG. 5.

Further, as shown in FIG. 6, the lamp housing 10 has a pawl 100 formed at the outer peripheral portion of its four side surfaces. The pawl 100 is formed at the edge of the perimeter of the lamp housing 10, and bites into a coating material 21 to be described later of the ceiling trim 2 so as to eliminate the gap between the room lamp 1 and the ceiling trim 2. Moreover, the pawl 100, together with the guide projection 101, abuts against the slant side surface 23 of the recess 22 of the ceiling trim 2 during the permanent fixing, thereby positioning the room lamp 1 and the ceiling trim 2.

Note that, although the above-described constituent components 140 to 144 are each formed integrally with the lamp housing 10 by insert molding, these components can also be formed separately from the lamp housing 10 and, after the lamp housing 10 is molded, fitted thereto by heat caulking, insertion, bonding, or any other known method.

<Description of Lens 11 and Others>

Figure 14A:
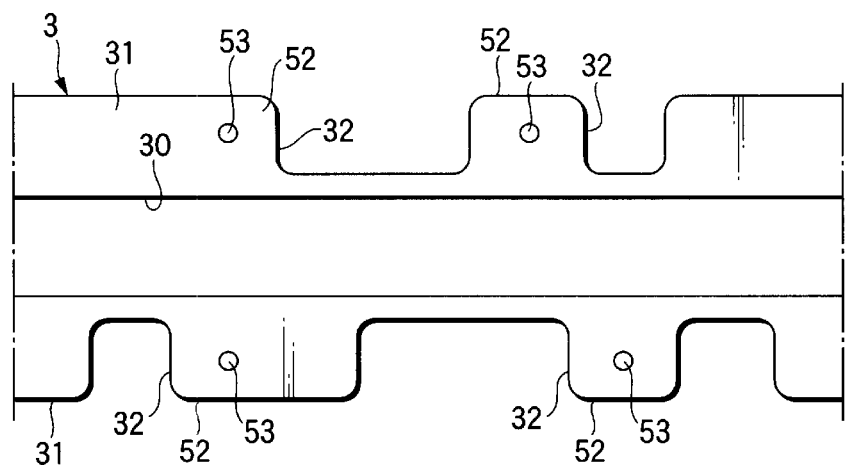
FIGS. 14(A), 14(B), and 14(C) are bottom views, with FIG. 14(A) showing the construction taken in the direction of arrow XIV(A) of FIG. 11.
Figure 14B:
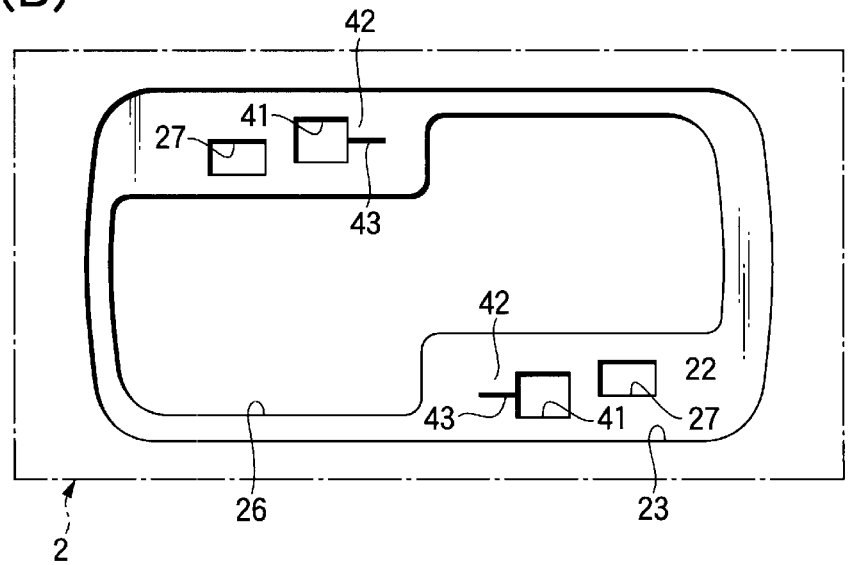
Figure 14C:
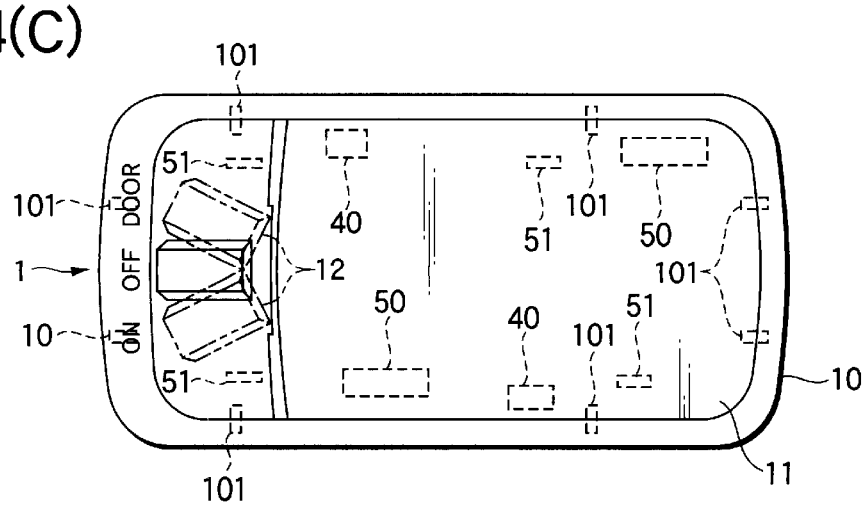

As shown in FIGS. 3 to 6 and 14(C), the lens 11 is detachably attached to the bottom surface of the lamp housing 10. As shown in FIGS. 4 and 14(C), the switching operation knob 12 is rotatably attached to the bottom surface of the lamp housing 10 with a screw 121. The switching operation knob 12 has its one end, i.e., a knob end 122, extended horizontally with respect to the lens 11, and has its other end opposite from the knob end 122 attached via a coil spring 123 to the aforementioned moving contact ball 120.

As shown in FIG. 14(C), when the switching operation knob 12 is in the "OFF" position, the electric circuit is in the off state and the light source bulb 13 remains deactivated. When the switching operation knob 12 is turned to the "ON" position, the electric circuit is in the on state and the light source bulb 13 starts to emit light through the lens 11.

Moreover, when the switching operation knob 12 is turned to the "DOOR" position, the electric circuit is brought into the active state via the door switch. In this state, when the door is closed, the electric circuit is in the off state and the bulb 13 remains deactivated. When the door is opened, the electric circuit is in the on state and the light source bulb 13 starts to emit light through the lens 11. In this way, turning the knob 12 allows the moving contact ball 120 to be switched, and consequently the above-described predetermined electric circuit is established.

<Description of Ceiling Trim>

In FIG. 2, reference numeral 2 denotes a ceiling trim. As shown in FIGS. 2 to 5, the ceiling trim 2 is disposed in the ceiling of the motor vehicle's interior. The ceiling trim 2 is composed of, for example, a base material 20, such as urethane foam, and a coating material 21, such as a felt, bondedon the bottom surface of the base material 20.

The ceiling trim 2 composed of the base material 20, such as urethane foam, and the coating material 21, such as a felt, laminated on each other is taken up as an example of a construction having its surface stiffened by using a felt or the like. However, the surface of the ceiling trim 2 may be made soft and flexible by using instead a combination of urethane foam and sheet fabric.

Figure 11:
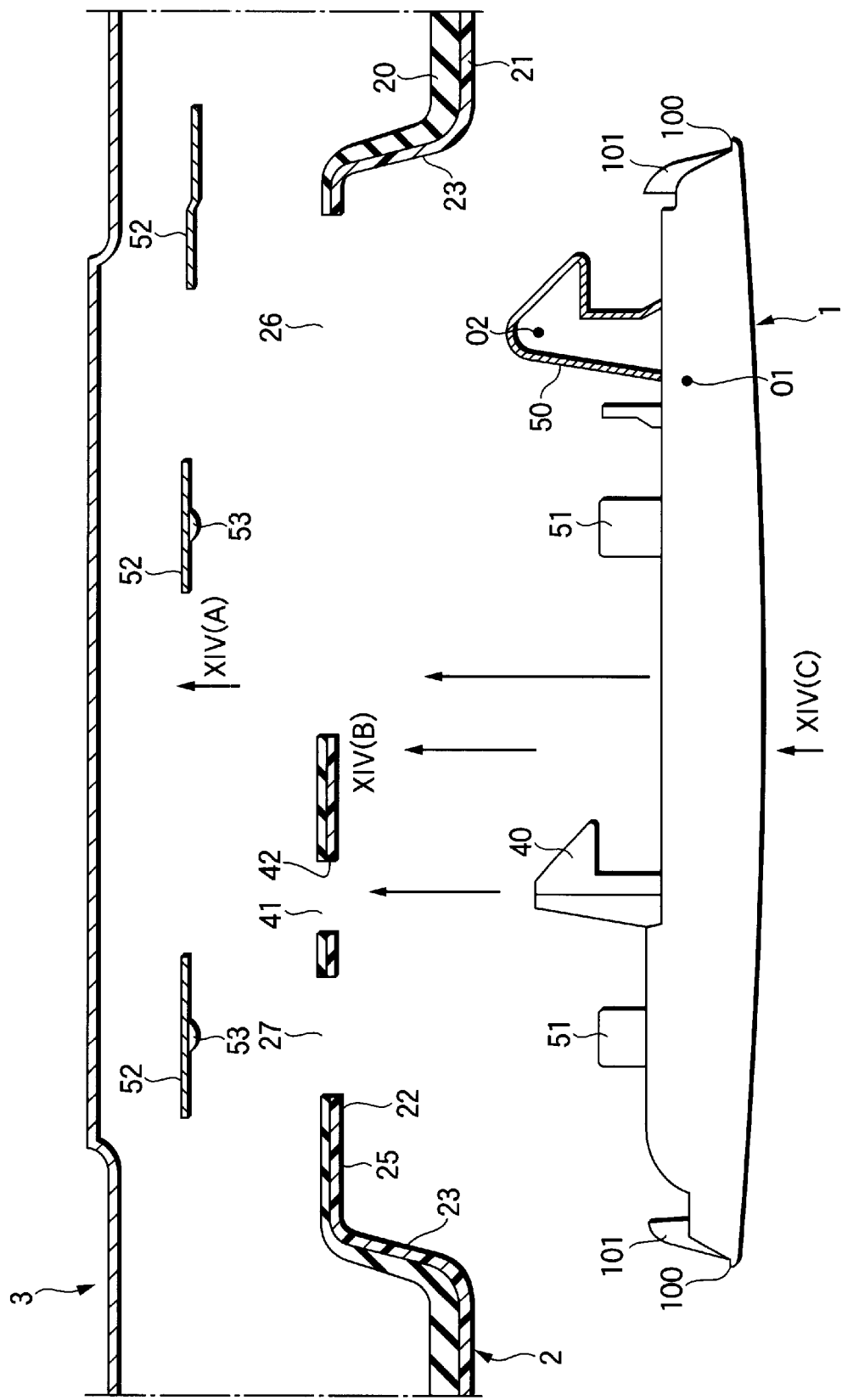
FIG. 11 is a vertical sectional view illustrating the yet-to-be fixed room lamp, ceiling trim, and ceiling framework.

As shown in FIG. 11, the ceiling trim 2 has, in its specific region where the room lamp 1 is disposed, a recess 22 curved concavely upwardly for housing the room lamp 1. As shown in FIG. 2 and others, the recess 22 is of substantially a rectangular shape like the room lamp 1, and has four side surfaces 23, each of which is, as shown in FIGS. 11 and others, inclined so as to become gradually narrow from a bottom-surface opening portion 24 to a top-surface bottom portion 25. The four slant side surfaces 23 abut against the guide projection 101 (and the pawl 100) during the permanent fixing, thereby positioning the room lamp 1 and the ceiling trim 2.

Moreover, as shown in FIG. 11, in the top-surface bottom portion 25 of the recess 22 is formed a top-surface opening portion 26. The top-surface opening portion 26 allows the protrusions protruding upwardly from the top surface of the room lamp 1, namely, the holder portion 140, a connector portion 145 in which the terminal portion 141 is arranged, the plate portion 144, the light source bulb 13, and others to pass through the top-surface bottom portion 25 and thereby prevents the protrusions and the ceiling trim 2 from colliding with each other.

<Description of Ceiling Framework>

In FIG. 2, reference numeral 3 denotes a ceiling framework of the car body. As shown in FIGS. 2 to 5, the ceiling framework 3, formed by press working or the like, is hollow at its middle portion upwardly to form a recess 30, and has its right and left ends extended in the X direction to form horizontal parts 31. The recess 30 accommodates the protrusions of the room lamp 1 protruding from the top-surface opening portion 26 of the ceiling trim 2.

<Description of Temporary Fixing Means>

Figure 3:
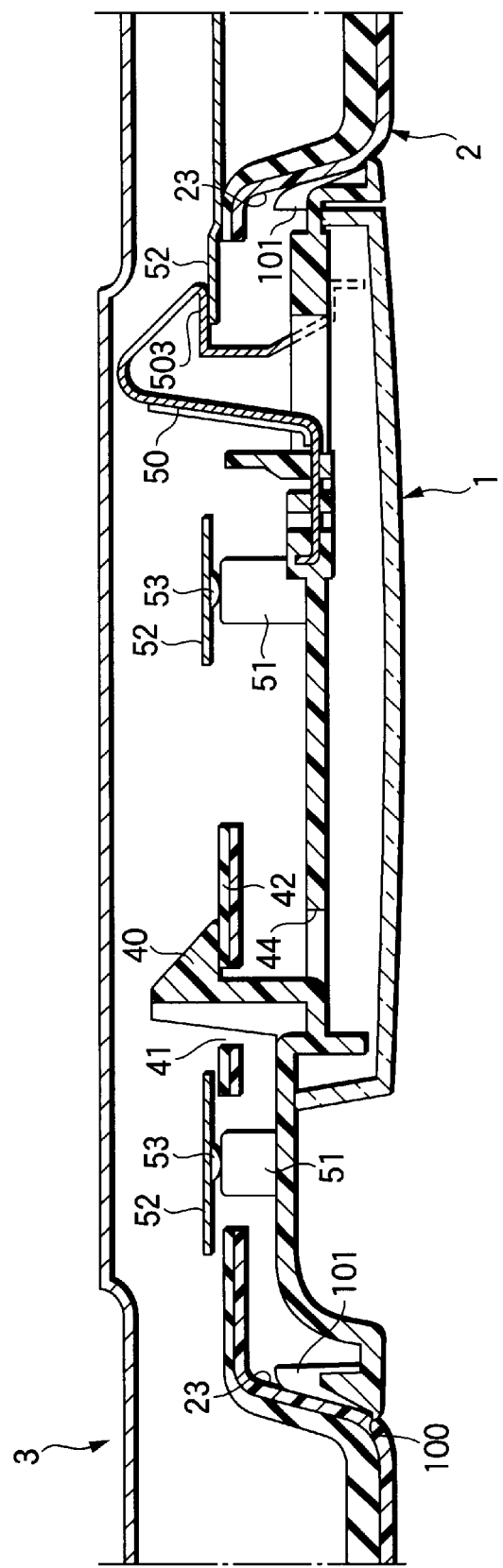
FIG. 3 is a sectional view illustrating the construction shown in FIG. 1 taken along a line III—III.
Figure 9:
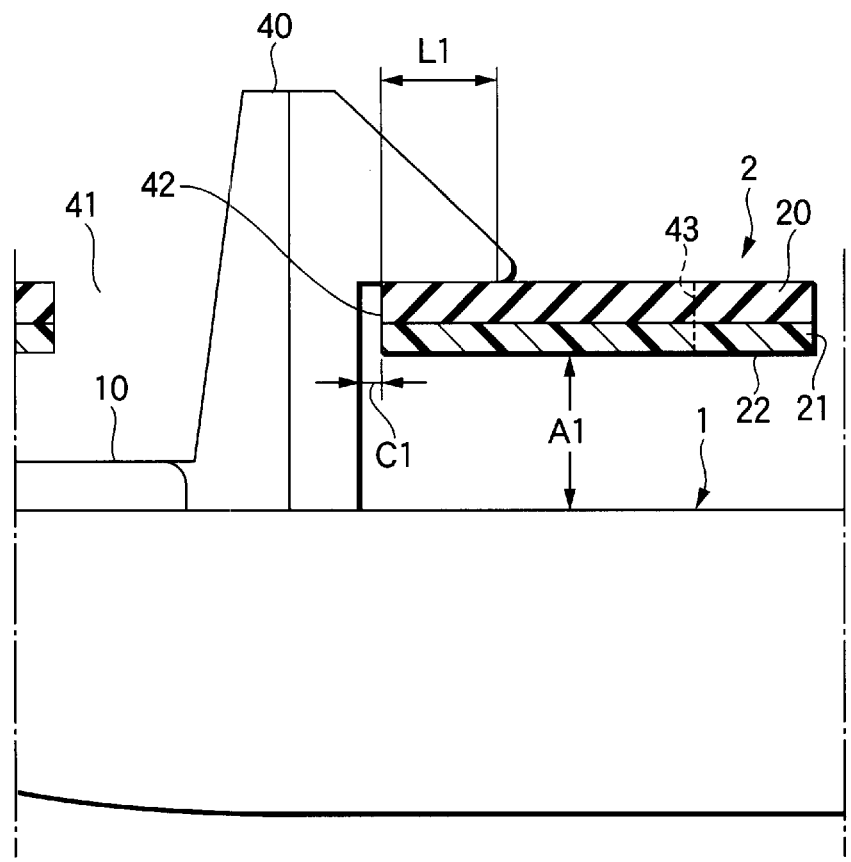
FIG. 9 is an enlarged partial sectional view illustrating the engagement pawl engaged with the edge of the engagement clearance hole.

Two temporary fixing means 4 are provided for the room lamp 1 and the ceiling trim 2. As shown in FIGS. 2, 3, and 9, the temporary fixing means 4 is composed of two engagement pawls 40 formed integrally with the room lamp 1 and edges 42 of two engagement clearance holes 41 provided in the ceiling trim 2. In the room lamp 1, of the two engagement pawls 40 of the temporary fixing means 4, one is formed in the vicinity of the switching operation knob 12, and the other is formed in a position that is slightly distant therefrom. Note that, in FIG. 3, reference numeral 44 denotes a clearance hole for withdrawing a molding die, which is used to mold the engagement pawl 40 integrally in the lamp housing 10 so as to protrude therefrom.

As shown in FIG. 2, the two engagement pawls 40 are harpoon-shaped pawls formed on the top surface of the lamp housing 10 so as to protrude upwardly therefrom. The two engagement pawls 40 are so arranged as to point in opposite directions. The two engagement clearance holes 41, shaped like small quadrangular holes, are made large enough to permit the insertion of the engagement pawl 40. The two engagement clearance holes 41 each have a slit (a notch) 43 piercingly formed in the edge 42 thereof. The engagement pawl 40 passes through the slit 43, is inserted into the engagement clearance hole 41, and is detachably caught in the edge 42 of the engagement clearance hole 41, thereby temporarily fixing the room lamp 1 to the ceiling trim 2.

Now, with reference to FIG. 9, a description will be given below as to the engagement between the engagement pawl 40 and the edge 42 of the engagement clearance hole 41.

As shown in FIG. 9, between the engagement pawl 40 and the edge 42 of the engagement clearance hole 41 kept in the temporary fixing state is formed a clearance (a gap) Cl. The clearance Cl, during the permanent fixing to be described later, compensates for the positional deviation between the room lamp 1 and the ceiling trim 2.

Moreover, a lap L1 is provided for the engagement pawl 40 and the edge 42 of the engagement clearance hole 41. The lap L1 provides a temporary fixing force that is strong enough to keep the engagement pawl 40 and the edge 42 of the engagement clearance hole 41 in engagement during from the temporary fixing to the permanent fixing (to prevent the room lamp 1 and the ceiling trim 2 temporarily fixed to each other from slipping out until they are permanently fixed to the ceiling framework 3). The lap L1 is made larger than the clearance C1.

Further, as shown in FIG. 9, between the room lamp 1 and the ceiling trim 2 temporarily fixed to each other (between the lamp housing 10 and the top-surface bottom portion 25 of the recess 22 facing with each other) is provided a gap A1.

The gap A1 is provided for the purpose of coping with changes in the board thickness of the ceiling trim 2 due to variation in its material and structure.

In this construction, as shown in FIGS. 2 and 9, by using the slit (notch) 43 provided in the edge 42 of the engagement clearance hole 41, the engagement and disengagement between the engagement pawl 40 and the edge 42 of the engagement clearance hole 41 can be done easily.

<Description of Permanent Fixing Means>

A permanent fixing means 5 is provided for the room lamp 1 and the ceiling framework 3. As shown in FIGS. 2, 3, 7, 8, and 10, the permanent fixing means 5 is composed of two spring retainers 50 and four abutting portions 51 provided in the room lamp 1, and four stationary portions 52 provided in the ceiling framework 3.

As shown in FIGS. 1 and 2, in the room lamp 1, of the two spring retainers 50 constituting the permanent fixing means 5, one is formed in the vicinity of the switching operation knob 12, and the other is formed in a position that is diagonally distant therefrom. Moreover,the spring retainer 50 is so formed as to extend laterally across mutually-facing both edges of a rectangular clearance hole 102 provided in the lamp housing 10.

The spring retainer 50 is, like the holder portion 140, the terminal portion 141, the stationary contact portion 142, the wiring portion 143, and the plate portion 144, made from a metal plate having elasticity and conductivity and is formed integrally with the lamp housing 10 of the room lamp 1 by insert molding.

Figure 7:
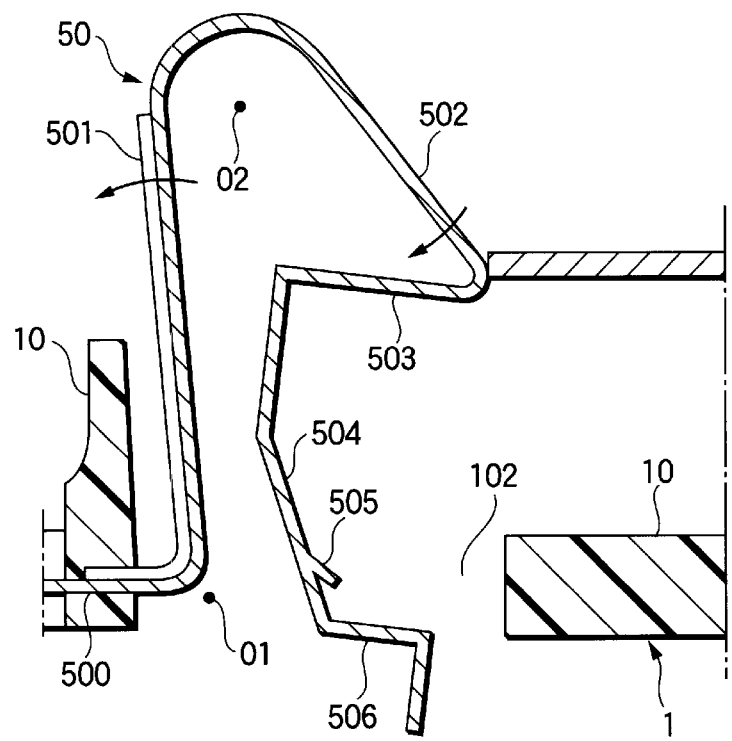
FIG. 7 is an enlarged partial sectional view illustrating the spring retainer in its elastically deformed state.

As shown in FIG. 7, the spring retainer 50 is composed of a buried portion 500, a first elastically deformable portion 501, a second elastically deformable portion 502, a pawl portion 503, a leg portion 504, a cutout portion 505, and an elastic catch portion 506. The buried portion 500 is embedded horizontally within the lamp housing 10. The first elastically deformable portion 501 is bent into substantially an L shape obliquely upwardly from the buried portion 500 and is elastically deformable about a first fulcrum 01, acting as the center of rotation, in the direction indicated by the arrow in FIG. 7 and in the direction reverse to the arrow. The second elastically deformable portion 502 is bent into substantially an inverted U shape obliquely downwardly from the first elastically deformable portion 501 and is elastically deformable about a second fulcrum 02, acting as the center of rotation, in the direction indicated by the arrow in FIG. 7 and the direction reverse to the arrow. The pawl portion 503 is bent substantially horizontally from the second elastically deformable portion 502. The leg portion 504 is bent downwardly from the pawl portion 503. The cutout portion 505 is obtained by cutting and raising part of the leg portion 504. The elastic catch portion 506 is bent into substantially an L shape from the tip of the leg portion 504.

Figure 8:
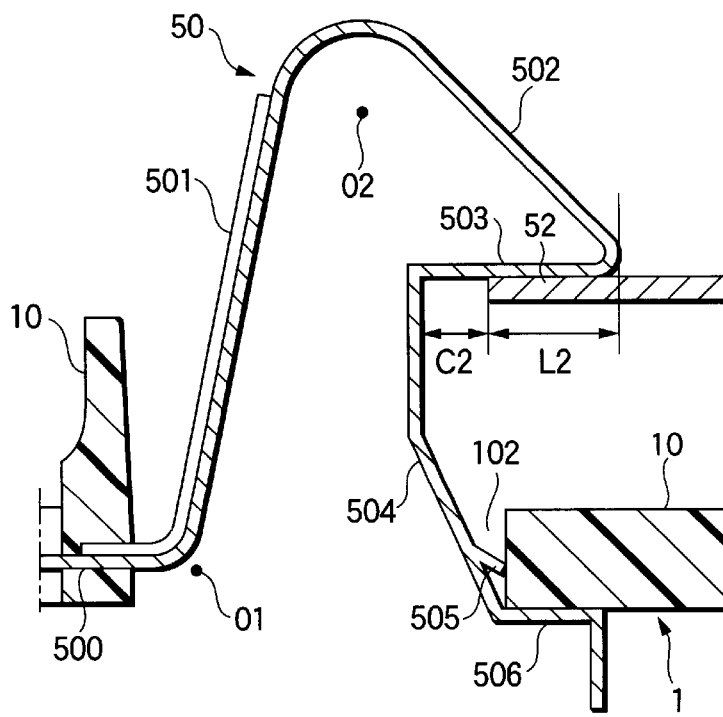
FIG. 8 is an enlarged partial sectional view illustrating the spring retainer engaged elastically with the stationary portion.

As shown in FIG. 8, the elastic catch portion 506 is, during the permanent fixing to be described later, caught in the edge of the clearance hole 102 of the lamp housing 10 so as to increase the stiffness of the permanent fixing state of the spring retainer 50. This ensures steady permanent fixing. Similarly, the cutout portion 505 makes elastic contact with the edge of the clearance hole 102 so as to increase the stiffness of the permanent fixing state of the spring retainer 50. This also ensures steady permanent fixing.

Note that, the two spring retainers 50 have their pawl portions 503 arranged back to back and are formed in the lamp housing 10 by insert molding.

Figure 10:
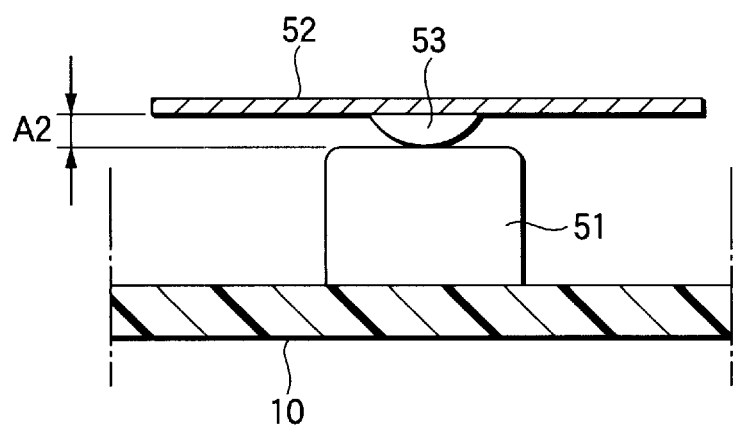
FIG. 10 is an enlarged partial sectional view illustrating the abutting portion abutting against the stationary portion.

Moreover, as shown in FIG. 10, the four abutting portions 51 are rib-shaped and formed integrally on the top surface of the lamp housing 10 so as to protrude therefrom. Of the four, two abutting portions 51, together with the two spring retainers 50, are located in the top-surface opening portion 26 of the ceiling trim 2. The other two abutting portions 51 are located in a small quadrangular clearance hole 27 provided in the ceiling trim 2. This construction, during the permanent fixing to be described later, prevents the ceiling trim 2 and the permanent fixing means 5 from colliding with each other.

In this construction, as shown in FIG. 10, the stationary portion 52 has, in its specific region against which the abutting portion 51 abuts, a bead-shaped projection 53. A height A2 of the projection 53 is so determined as to cope with changes in the board thickness of the ceiling framework 3 due to variation in its material and structure.

Moreover, as shown in FIG. 2, the four stationary portions 52 are each disposed in a cut-out portion 32 of the horizontal part 31 of the ceiling framework 3. In this construction, the cut-out portion 32 serves to keep intact the temporary fixing state achieved by the temporary fixing means 4 (the engagement of the engagement pawl 40 with the edge 42 of the engagement clearance hole 41) during the permanent fixing to be described later.

As shown in FIG. 3, with the permanent fixing means 5, the permanent fixing is achieved such that the pawl portion 503 of the spring retainer 50 is elastically caught in the top surface of the stationary portion 52, and the abutting portion 51 makes contact with the bottom surface of the stationary portion 52 so as to sandwich the stationary portion 52 between the spring retainer 50 and the abutting portion 51.

Next, with reference to FIG. 8, a description will be given below as to the responsibility of the spring retainer 50 for the permanent fixing.

As shown in FIG. 8, between the spring retainer 50 and the stationary portion 52 kept in elastic engagement (in the permanent fixing state) is formed a clearance C2. The clearance C2, during the permanent fixing, compensates for the positional deviation between the room lamp 1 and the ceiling framework 3.

Moreover, as shown in FIG. 8, between the spring retainer 50 and the stationary portion 52 is formed a lap L2 which is larger than the clearance C2. In this construction, even if, during the permanent fixing, the room lamp 1 is shifted to compensate for the positional deviation relative to the ceiling framework 3, the elastic engagement of the spring retainer 50 with the stationary portion 52 will never be released.

The permanent fixing means described above is designed for a case where the ceiling trim 2 is composed of the base material 20, such as urethane foam, and the coating material 21, such as a felt, laminated on each other so as to have a stiff surface.

Now, with reference to FIG. 15(B), a description will be given below as to permanent fixing means designed for a case where the ceiling trim 2 has a flexible, soft surface.

Figure 13:
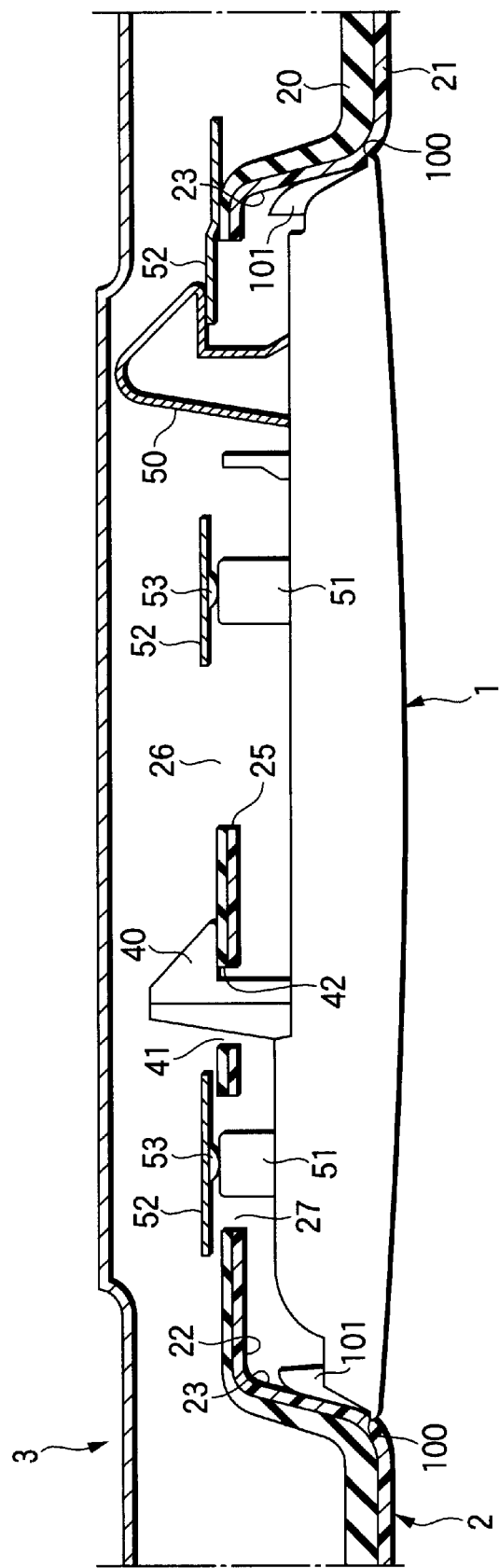
FIG. 13 is a vertical sectional view illustrating the room lamp, the ceiling trim, and the ceiling framework kept in the permanent fixing state.
Figure 15A:
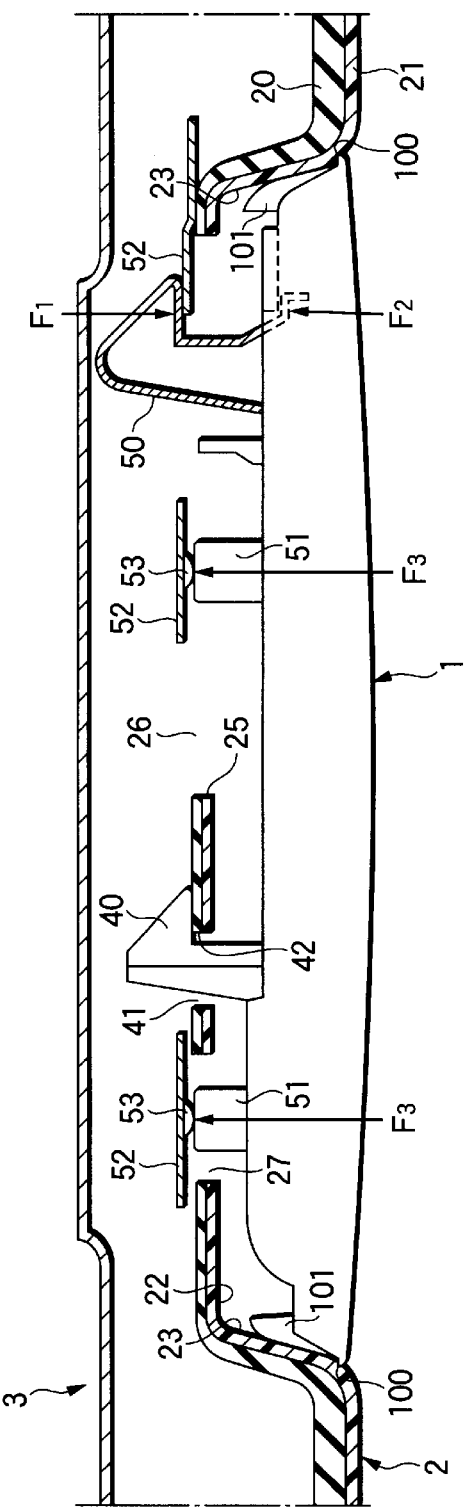
FIGS. 15(A) and 15(B) are vertical sectional views illustrating the room lamp, the ceiling trim, and the ceiling framework kept in the permanent fixing state, with FIG. 15(A) showing the case where the ceiling trim is made stiff, and FIG. 15(B) showing the case where the ceiling trim is made soft.
Figure 15B:
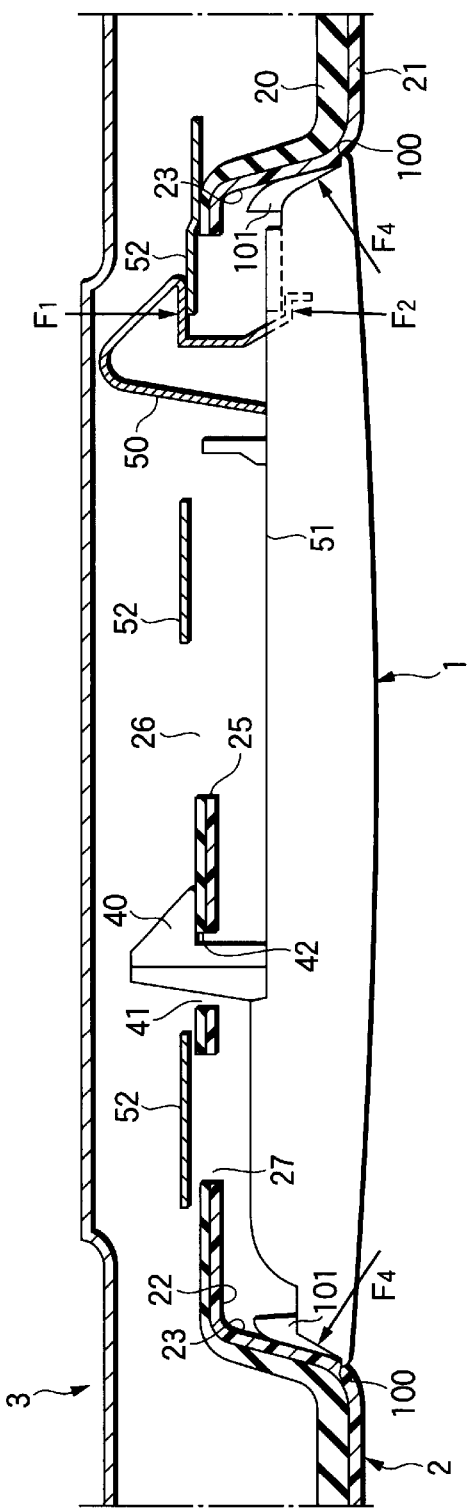

As shown in FIG. 15(B), this permanent fixing means requires neither the abutting portion 51 of the room lamp 1 nor the projection 53 of the stationary portion 52 in contrast to the case where the ceiling trim 2 has a stiff surface as shown in FIG. 15(A) corresponding to FIG. 13. That is, where the ceiling trim 2 has a soft surface, the permanent fixing is achieved by the nipping action of the spring retainer 50 and the biting of the guide projection 101 of the room lamp 1 into the surface of the ceiling trim 2.

<Description of Fixing operation>

The room lamp fixing structure of the embodiment has been described hereinbefore. Hereinafter, an operation procedure for fixing a room lamp will be described.

(1) Temporary Fixing Procedure

Figure 12:
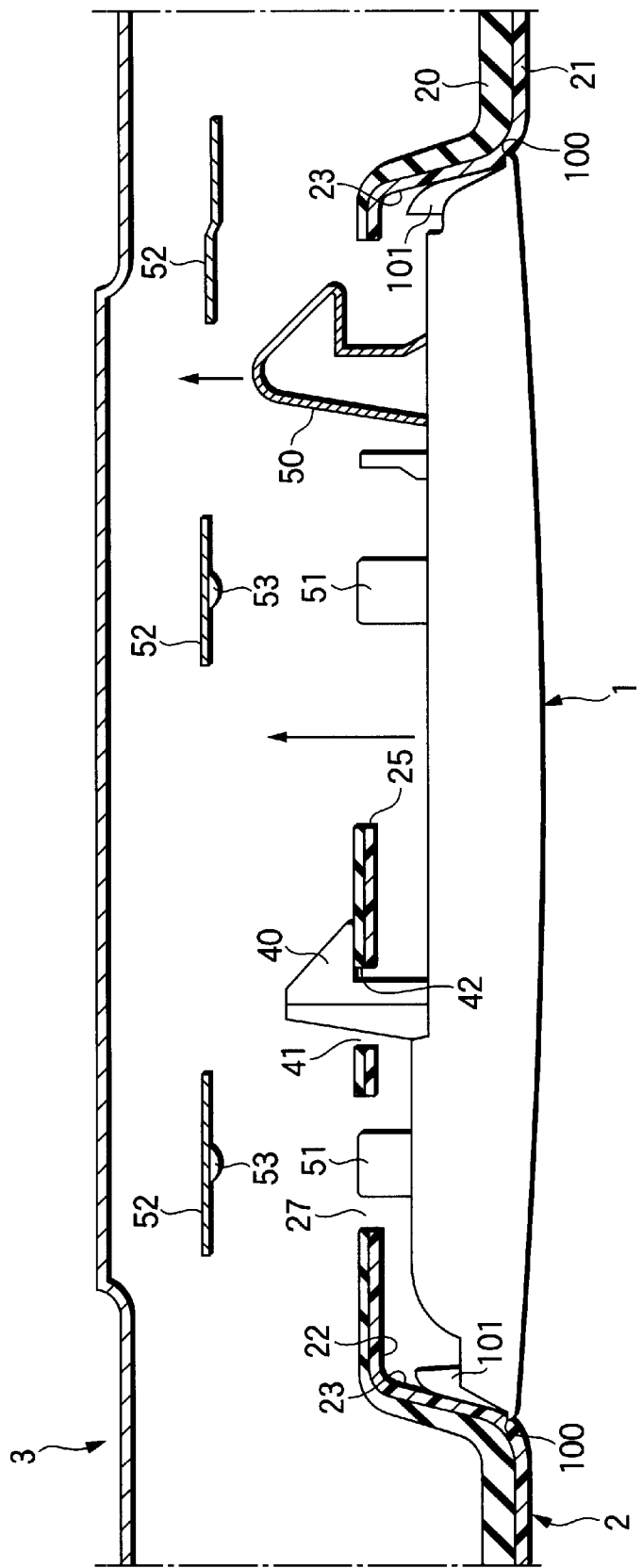
FIG. 12 is a vertical sectional view illustrating the room lamp and the ceiling trim kept in the temporary fixing state.

In this temporary fixing procedure, as shown in FIGS. 11 and 12, the room lamp 1 is, before being incorporated into the automobile assembly line, accommodated in the recess 22 of the ceiling trim 2. Simultaneously the room-lamp 1-side engagement pawl 40 is caught in the edge 42 of the ceiling-trim 2-side engagement clearance hole 41, and thereby the room lamp 1 and the ceiling trim 2 are temporarily fixed to each other. At this time, as shown in FIG. 6, the guide projection 101 of the room lamp 1 and the engagement pawl 100 temporarily abut against the coating material 21 of the recess 22 of the ceiling trim 2.

In this procedure, the room lamp 1 and the ceiling trim 2 are modularized to form a module ceiling (a subassembly of the ceiling).

(2) Permanent Fixing Procedure

Subsequently, the module ceiling consisting of the room lamp 1 and the ceiling trim 2 temporarily fixed to each other by the temporary fixing means 4 is incorporated into the automobile assembly line. In the automobile assembly line, according to the permanent fixing procedure, as shown in FIGS. 12 and 13, the room lamp 1 and the ceiling trim kept in the temporary fixing state are pushed in the direction indicated by an arrow so as to reach the ceiling-framework 3-side region.

By this pushing action, as shown in FIGS. 7 and 8, the spring retainer 50 is elastically caught in the stationary portion 52, and, as shown in FIG. 10, the abutting portion 51 abuts against the projection 53 of the stationary portion 52 so as to sandwich the ceiling-framework 3-side stationary portion 52 between the room-lamp 1-side spring retainer 50 and the abutting portion 51.

Consequently, with this fixing mechanism, the room lamp 1 in its temporary fixing state is permanently fixed by the permanent fixing means 5 to the ceiling framework 3, and the room lamp 1 and the ceiling trim 2 kept in the temporary fixing state are concurrently fixed to the ceiling framework 3.

At this moment, as shown in FIGS. 3 to 6 and 13, in this construction, the guide projection 101 of the room lamp 1, now making temporary contact with the slant side surface 23 of the recess 22 of the ceiling trim 2, is forcedly pressed thereagainst. Then, by the resultant guiding effect of the guide projection 101 and the slant side surface 23, the room lamp 1 and the ceiling trim 2 kept in the temporary fixing state are positioned.

That is, in this fixing mechanism, as shown in FIG. 6, by bringing the guide projection 101 located on the shorter side into contact with the slant side surface 23, positioning and backlash restriction are achieved in the X direction (see FIG. 2). Moreover, by bringing the guide projection 101 located on the longer side into contact with the slant side surface 23, positioning and backlash restriction are achieved in the Y direction.

Further, in this fixing mechanism, by the permanent fixing means 5 (in this embodiment, the elastic engagement of the spring retainer 50 with the stationary portion 52) and by bringing the guide projections 101 located on the four sides into contact with the slant side surface 23, positioning and backlash restriction are achieved in the Z direction.

As described heretofore, according to the present invention, the fixing structure includes separately-provided temporary and permanent fixing means and is so designed that, during permanent fixing, both of the fixing means can compensate for positional deviation. This makes it possible to, during the permanent fixing, compensate for the positional deviation occurring with the temporary fixing.

Note that, the embodiment described above deals with the case where the ceiling trim 2 is composed of the base material 20, such as urethane foam, and the coating material 21, such as a felt, bonded on the bottom surface of the base material 20, that is, the case where the ceiling trim 2, i.e., the molded ceiling, is made stiff by using a felt. As examples of materials used to form a stiff ceiling trim, besides the aforementioned combination of urethane foam and a felt, a combination of urethane foam and resin or non-woven fabric may be employed. In the embodiment, where the molded ceiling is made of a stiff material, as shown in FIG. 8, the spring retainer 50 grips the stationary portion 52 and the lamp housing 10, and, as shown in FIG. 13, the abutting portion 51 is pressed against the projection 53. Consequently, the lamp housing module is steadily fixed to the molded ceiling.

By contract, where the ceiling trim 2 is made of a relatively soft material, for example, a combination of urethane foam and sheet fabric, the slant side surface 23 of the ceiling trim 2 (see FIG. 6) exerts elastic force, and the guide projection 101 of the lamp housing 10 bites into the slant side surface 23, and thereby, during the permanent fixing, the dimensional error appearing in the Z direction can be successfully compensated for. This, in cooperation with the nipping action of the spring retainer 50, ensures steady fixing and thus simplifies the fixing structure and eliminates the need for the projection 53 and the abutting portion 51. Note that, also in the case where the molded ceiling is made soft, the guide projection 101 of the lamp housing 10 is guided by the slant side surface 23 of the ceiling trim 2, and thereby, just as in the case where the molded ceiling is made stiff, positioning and backlash restriction can be successfully achieved in the X and Y directions.

FIGS. 15(A) and 15(B) show the difference in the permanent fixing state between the case where the molded ceiling is stiff and the case where it is soft. Specifically, in FIG. 15(A) showing the former case, the module is grippingly held by the force $F_1$ and $F_2$ developed by the nipping action of the spring retainer 50 and the force $F_3$ exerted by the projection 53 and the abutting portion 51. In FIG. 15(B) showing the latter case, the module is grippingly held by the force $F_1$ and $F_2$ developed by the nipping action of the spring retainer 50 and the biting force $F_4$ of the guide projection 101 applied to the slant side surface 23.

<Description of Action and Advantages>

As described heretofore, the room lamp fixing structure of the embodiment allows easy positioning of the room lamp 1 and the ceiling trim 2. Moreover, the positioning mechanism is composed of the guide projection 101 provided in the room lamp 1, the slant side surface 23 provided in the recess 22 of the ceiling trim 2, and the permanent fixing means 5 (the spring retainer 50 and the stationary portion 52 of the ceiling framework 3) and is thus structurally simple and inexpensive.

Particularly, in this embodiment, by sandwiching the stationary portion 52 between the spring retainer 50 and the abutting portion 51 of the permanent fixing means 5, positioning and backlash restriction are achieved in the Z direction. Moreover, in this embodiment, by bringing the pawl 100 formed at the outer peripheral portion of the four side surfaces of the room lamp 1 into contact with the slant side surface 23 of the recess 22 of the ceiling trim 2, positioning and backlash restriction are achieved in the X, Y, and Z directions. Consequently, in this embodiment, the positioning of the room lamp 1 and the ceiling trim 2 can be achieved more accurately, and in addition occurrence of backlash between the room lamp 1 and the ceiling trim 2 can be prevented more successfully.

Moreover, in this embodiment, the room lamp 1 has in each of its four sides two rib-shaped guide projections 101 arranged with a certain interval secured therebetween. This prevents, without fail, the room lamp 1 and the ceiling trim 2 from being inclined mutually with respect to the axes extending in the X, Y, and Z directions.

As described above, with the room lamp fixing structure of the embodiment, in the automobile assembly line, the ceiling trim 2 and the room lamp 1 can be concurrently fixed to the ceiling framework 3. This helps reduce the number of assembly man-hours required for the automobile assembly line.

Note that the above-described ceiling trim 2 is fixed relatively to the ceiling framework 3 by, in addition to the above-described permanent fixing means 5, another fixing means. As examples of this additional fixing means, there have been known map lamp fixing means, means for fixing lamps located at the right and left rear ends of an interior, means for fixing ceiling grip member, or the like.

Further, in this embodiment, although the room lamp 1 has in each of its four side surfaces (four sides) two guide projections 101 arranged with a certain interval secured therebetween, in the room lamp fixing structure of the present invention, only one, or three or more guide projections may be provided in each side surface thereof.

Still further, according to the present invention, where the ceiling trim has a soft surface, by allowing the guide projection 101 of the lamp housing 10 to bite into the slant side surface 23, the dimensional error appearing in the Z direction can be successfully compensated for during the permanent fixing. This, in cooperation with the nipping action of the spring retainer 50, ensures steady fixing and thus simplifies the fixing structure.

As will be apparent from the foregoing description, the room lamp fixing structure according to the present invention allows easy positioning of the room lamp and the ceiling trim kept in the temporary fixing state by exploiting the guiding effect of the guide projection and the slant side surface. Moreover, the positioning mechanism is composed of the guide projection provided in the room lamp and the slant side surface provided in the recess of the ceiling trim, and is thus structurally simple and inexpensive.

While there has been described what are at present considered to be preferred embodiments of the invention, it will be understood that various modifications may be made thereto, and it is intended that the appended claims cover all such modification as fall within the true spirit and scope of the invention.

What is claimed is:

1. A room lamp fixing structure having temporary fixing means provided for a room lamp and a ceiling trim and permanent fixing means provided for said room lamp and a ceiling framework of a car body, said room lamp fixing structure comprising:
    a ceiling trim having a recess for accommodating said room lamp, said recess having its side surface inclined so as to become gradually narrow from an opening portion to a bottom portion;
    a room lamp having in its side surface a guide projection for positioning said room lamp and said ceiling trim by abutting against the slant side surface of said recess during permanent fixing;
    temporary fixing means for temporarily fixing said room lamp and said ceiling trim to one another; and
    permanent fixing means for fixing said room lamp and said ceiling trim kept in a temporary fixing state to said ceiling framework by permanently fixing said room lamp to said ceiling framework.

2. A room lamp fixing structure according to claim 1,
    wherein said temporary fixing means is composed of an engagement pawl provided in said room lamp and an edge of an engagement clearance hole provided in said ceiling trim, the edge of the engagement clearance hole of said ceiling trim having a slit, and said engagement pawl is, after passing through said slit and said engagement clearance hole, detachably caught in the edge of said engagement clearance hole, thereby achieving said temporary fixing,
    wherein, between said engagement pawl and the edge of said engagement clearance hole is formed a clearance for compensating for positional deviation between said room lamp and said ceiling trim during said permanent fixing, and
    wherein, between the engagement pawl and the edge of said engagement clearance hole is formed a lap providing a temporary fixing force being strong enough to keep said temporary fixing state intact until said permanent fixing is started.

3. A room lamp fixing structure according to claim 1, wherein, a gap is provided between said room lamp and a bottom portion of said recess facing with each other to cope with changes in a board thickness of said ceiling trim.

4. A room lamp fixing structure according to claim 1, wherein said permanent fixing means is composed of a spring retainer and an abutting portion provided in said room lamp and a stationary portion provided in said ceiling framework,
    wherein said spring retainer is elastically caught in said stationary portion, and said abutting portion abuts against said stationary portion so as to sandwich said stationary portion between said spring retainer and said abutting portion, thereby achieving said permanent fixing, and
    wherein, a clearance is provided between said spring retainer and said stationary portion, said clearance being for compensating for positional deviation between said room lamp and said ceiling framework during said permanent fixing, and allowance made for an elastic engagement between said spring retainer and said stationary portion is greater in area than said clearance.

5. A room lamp fixing structure according to claim 4, wherein said spring retainer has an elastic catch portion which is caught in said room lamp so as to increase stiffness of said permanent fixing state during said permanent fixing.

6. A room lamp fixing structure according to claim 4, wherein said stationary portion has a projection in its specific region against which said abutting portion abuts to cope with changes in the board thickness of said ceiling framework.

7. A room lamp fixing structure according to claim 1, wherein the guide projection is inclined along the slant side surface of the recess of said ceiling trim.

8. A room lamp fixing structure according to claim 7, wherein said guide projection is formed plurally in each of four slant side surfaces of the recess of said ceiling trim.

9. A room lamp fixing structure according to claim 2, wherein, a gap is provided between said room lamp and a bottom portion of said recess facing with each other to cope with changes in a board thickness of said ceiling trim.

10. A room lamp fixing structure according to claim 2, wherein said permanent fixing means is composed of a spring retainer and an abutting portion provided in said room lamp and a stationary portion provided in said ceiling framework, wherein said spring retainer is elastically caught in said stationary portion, and said abutting portion abuts against said stationary portion so as to sandwich said stationary portion between said spring retainer and said abutting portion, thereby achieving said permanent fixing, and wherein, a clearance is provided between said spring retainer and said stationary portion, said clearance being for compensating for positional deviation between said room lamp and said ceiling framework during said permanent fixing, and allowance made for an elastic engagement between said spring retainer and said stationary portion is greater in area than said clearance.

* * * * *